United States Patent US 12,267,013 B2
Nicholson et al. Apr. 1, 2025

(54) SERIES STACKED PHASE DC-DC CONVERTERS WITH STABLE OPERATION

(71) Applicant: Empower Semiconductor, Inc., Milpitas, CA (US)

(72) Inventors: Richard Nicholson, Aptos, CA (US); Xiaogang Feng, Fremont, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 127 days.

(21) Appl. No.: 17/820,986

(22) Filed: Aug. 19, 2022

(65) Prior Publication Data

US 2023/0057337 A1 Feb. 23, 2023

Related U.S. Application Data

(60) Provisional application No. 63/236,116, filed on Aug. 23, 2021.

(51) Int. Cl.
*H02M 3/158* (2006.01)
*H02M 1/00* (2006.01)

(52) U.S. Cl.
CPC ........... *H02M 3/158* (2013.01); *H02M 1/007* (2021.05); *H02M 1/0095* (2021.05)

(58) Field of Classification Search
CPC ..... H02M 1/0095; H02M 3/158; H02M 1/007
See application file for complete search history.

(56) References Cited

U.S. PATENT DOCUMENTS

| | | | |
|---|---|---|---|
| 7,230,405 B2 * | 6/2007 | Jang | H02M 3/1584 323/284 |
| 2015/0002115 A1 * | 1/2015 | Shenoy | H02M 3/1584 323/271 |
| 2018/0226890 A1 | 8/2018 | Dai | |
| 2020/0083805 A1 | 3/2020 | Mauri | |
| 2021/0359606 A1 * | 11/2021 | Han | H02M 1/0054 |
| 2022/0029540 A1 * | 1/2022 | Zhang | H02M 3/04 |
| 2022/0302828 A1 * | 9/2022 | Zafarana | H02M 3/1586 |

FOREIGN PATENT DOCUMENTS

| | | |
|---|---|---|
| CN | 110620503 | 12/2019 |
| TW | 201813263 | 4/2018 |
| WO | 2014169388 | 10/2014 |

* cited by examiner

*Primary Examiner* — Harry R Behm
(74) *Attorney, Agent, or Firm* — FisherBroyles, LLP

(57) ABSTRACT

A power converter circuit is disclosed. In one aspect, the power converter circuit includes a first top buck converter circuit coupled in parallel to a second top buck converter circuit at a first connection node and at a second connection node, and a bottom buck converter circuit coupled in series to each of the first and second top buck converter circuits at the second connection node, a power input terminal coupled to the first and second top buck converter circuits, and a power output terminal coupled to the bottom buck converter circuit and to the first connection node.

20 Claims, 2 Drawing Sheets

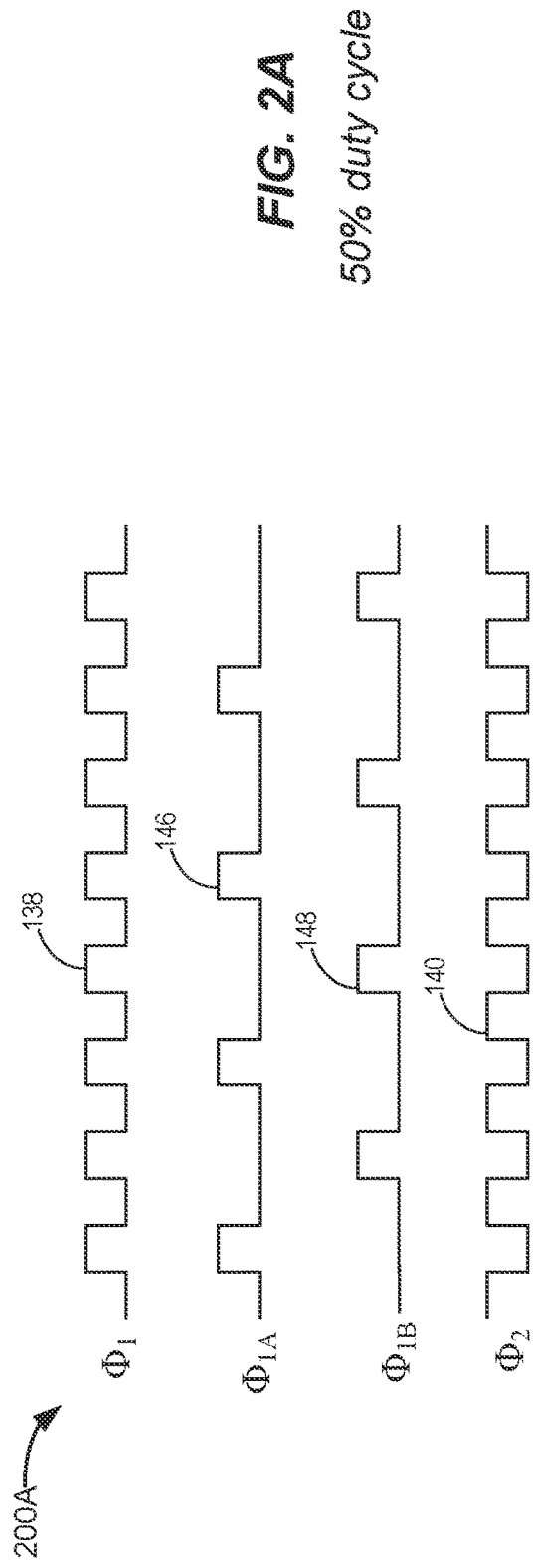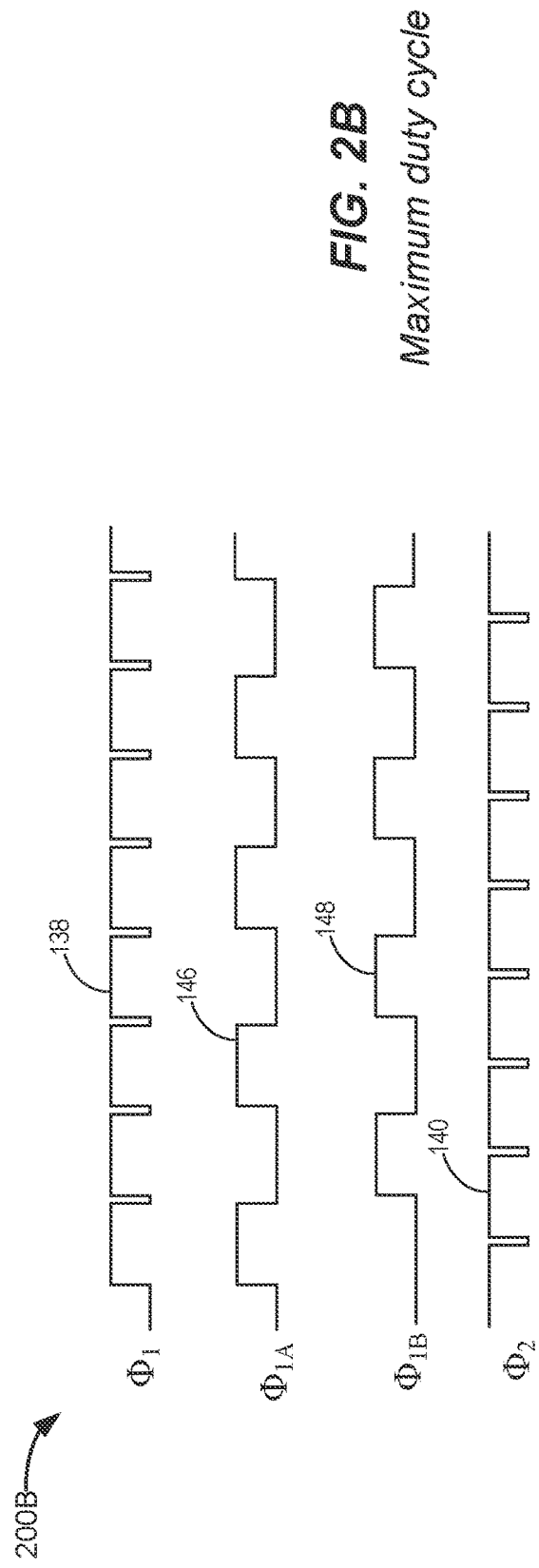

SERIES STACKED PHASE DC-DC CONVERTERS WITH STABLE OPERATION

CROSS-REFERENCES TO OTHER APPLICATIONS

This application claims priority to U.S. provisional patent application Ser. No. 63/236,116, for "SERIES STACKED PHASE DC-DC CONVERTERS WITH STABLE OPERATIONS" filed on Aug. 23, 2021, which is hereby incorporated by reference in its entirety for all purposes.

FIELD

The described embodiments relate generally to power converters, and more particularly, the present embodiments relate to series stacked DC-DC power converter circuits.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a circuit is disclosed. The circuit includes a first top buck converter circuit coupled in parallel to a second top buck converter circuit at a first connection node and at a second connection node, and a bottom buck converter circuit coupled in series to each of the first and second top buck converter circuits at the second connection node, a power input terminal coupled to the first and second top buck converter circuits, and a power output terminal coupled to the bottom buck converter circuit and to the first connection node.

In some embodiments, the first top buck converter circuit includes a first high-side switch coupled to a first low-side switch at a first switch node.

In some embodiments, the first top buck converter circuit includes a first flying capacitor coupled to the first switch node.

In some embodiments, the second top buck converter circuit includes a second high-side switch coupled to a second low-side switch at a second switch node.

In some embodiments, the power input terminal is coupled to the first and second high-side switches.

In some embodiments, the second top buck converter circuit includes a second flying capacitor coupled to the second switch node.

In some embodiments, the first flying capacitor is coupled to a first inductor through a first switch, and the second flying capacitor is coupled to the first inductor through a second switch.

In some embodiments, the bottom buck converter circuit includes a third high-side switch coupled to a third low-side switch at a third switch node.

In some embodiments, the third switch node is coupled to a second inductor.

In some embodiments, the power output terminal is coupled to the third switch node through the second inductor and to the first connection node through the first inductor.

In some embodiments, a circuit is disclosed. The circuit includes a first top buck converter circuit coupled to an input terminal, a second top buck converter circuit coupled to the input terminal, the first top buck converter circuit coupled to the second top buck converter circuit at a first and second connection nodes, a bottom buck converter circuit coupled to the first and second top buck converter circuits at the second connection node, and an output terminal coupled to the bottom buck converter circuit and to the first connection node.

In some embodiments, the first top buck converter circuit includes a first high-side switch coupled to a first low-side switch at a first switch node.

In some embodiments, the first top buck converter circuit includes a first flying capacitor coupled to the first switch node.

In some embodiments, the second top buck converter circuit includes a second high-side switch coupled to a second low-side switch at a second switch node.

In some embodiments, the input terminal is coupled to the first and second high-side switches.

In some embodiments, the second top buck converter circuit includes a second flying capacitor coupled to the second switch node.

In some embodiments, the first flying capacitor is coupled to a first inductor through a first switch, and the second flying capacitor is coupled to the first inductor through a second switch.

In some embodiments, the bottom buck converter circuit includes a third high-side switch coupled to a third low-side switch at a third switch node.

In some embodiments, the third switch node is coupled to a second inductor.

In some embodiments, the first and second top buck converter circuits and the bottom buck converter circuit are arranged to generate an output voltage at the output terminal that is lower than an input voltage at the input terminal.

BRIEF DESCRIPTION OF THE DRAWINGS

FIG. 2A illustrates a switching sequence and timing diagram for circuit of FIG. 1 operating at 50% duty cycle according to an embodiment of the disclosure; and FIG. 2B illustrates a switching sequence and timing diagram for circuit of FIG. 1 operating at maximum duty cycle according to an embodiment of the disclosure.

DETAILED DESCRIPTION

Figure 1:
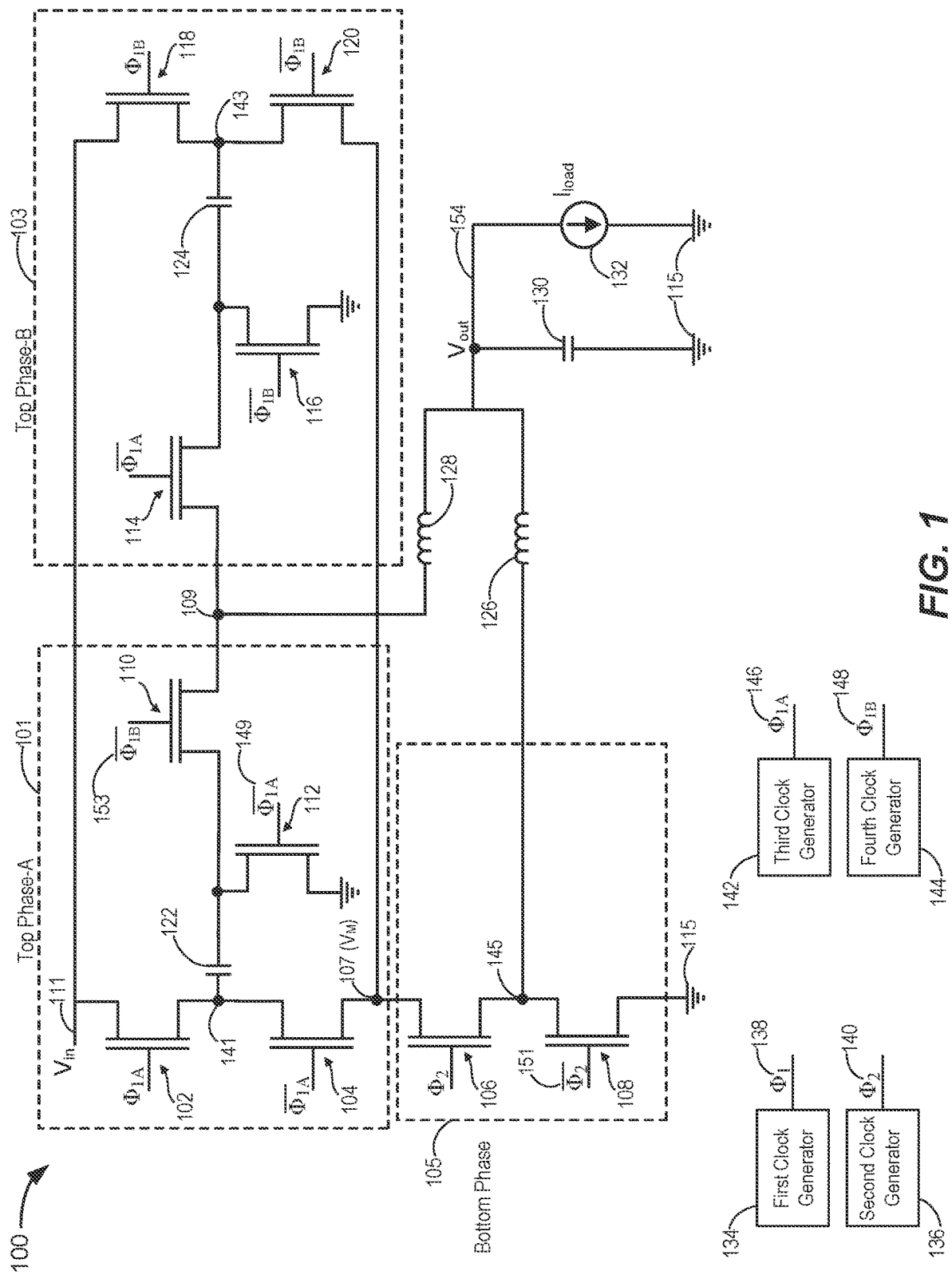
FIG. 1 illustrates a series stacked phase DC-DC power converter circuit according to an embodiment of the disclosure.

Circuits and related techniques disclosed herein relate generally to power converters. More specifically, circuits, devices and related techniques disclosed herein relate to series stacked phase direct-current to direct-current (DC-DC) power converters. In some embodiments, charge transfer between storage elements of a top phase and storage elements of a bottom phase of the series stacked phase DC-DC converter can be eliminated. The removal of the charge transfer between storage elements can result in the elimination of a positive feedback loop that can exist in series stacked phase DC-DC converters. By removing the positive feedback loop, embodiments of the present disclosure can prevent an interruption of the functioning of the series stacked phase DC-DC converter and can provide for a continuous stable operation of the converter.

In various embodiments, the elimination of the positive feedback loop and stable operation of the converter can be realized while allowing the converter to achieve 100% duty cycle in its operation. Further, embodiments of the present disclosure can enable the removal of the charge transfer between storage elements of the top phase and storage elements of the bottom phase of the converter without using higher voltage rated devices, thereby reducing system costs. Moreover, embodiments of the present disclosure can prevent an interruption of the functioning of the series stacked phase DC-DC power converter without affecting the efficiency of the power converter. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a series stacked phase DC-DC power converter circuit 100 according to an embodiment of the disclosure. As shown in FIG. 1, circuit 100 can include two top buck converter stages, shown in sections 101 (top phase-A) and 103 (top phase-B). Circuit 100 can further include a bottom buck converter stage shown in section 105 (bottom phase). The top or bottom phase buck converter stages can also be referred to as top or bottom buck converter circuits. The high-side and low-side switches in the buck converter in top phase-A 101 are duplicated in the top phase-B 103. Top phase-A 101 and top phase-B 103 can be coupled to an input terminal 111 and a connection node 107 to form a parallel configuration. Further, Top phase-A 101 and top phase-B 103 can be coupled together at a first connection node 109. Input terminal 111 can be arranged to receive an input voltage $V_{in}$. Top phase-A 101 and top phase-B 103 can be connected to the bottom phase 105 at connection node 107 (having a voltage $V_M$) in a series configuration. Top phase-A 101 can be a buck converter stage that can include switches 102 and 104 connected in series, and top phase-B 103 can be a buck converter stage that can include switches 118 and 120 connected in series. Bottom phase 105 stage can be a buck converter that includes switches 106 and 108 connected in series. Circuit 100 can include flying capacitors (flycap) 122 and 124. Flycap 122 can be coupled to a switch node 141 and flycap 124 can be coupled to a switch node 143. Circuit 100 can be connected between the input terminal 111 and ground 115. Circuit 100 can include an output terminal 154 having an output voltage $V_{out}$. Output terminal 154 can be coupled to a load capacitor 130 and a load 132. In some embodiments, $V_{out}$ can have a value that is less that a value of $V_{in}$. Circuit 100 can further include inductor 128 that is coupled between the first connection node 109 and output terminal 154. Circuit 100 can also include inductor 126 that is connected between a switch node 145 and output terminal 154.

Circuit 100 can further include a first clock generator 134 that generates first clock $\Phi_1$ 138, a second clock generator 136 that generates second clock $\Phi_2$ 140, a third clock generator 142 that generates third clock $\Phi_{1A}$ 146 and a fourth clock generator 144 that generates fourth clock $\Phi_{1B}$ 148. In some embodiments, third clock $\Phi_{1A}$ 146 and fourth clock $\Phi_{1B}$ 148 can be generated from the first clock $\Phi_1$ 138. Top phase-A 101 can further include switches 110 and 112. Switches 110 and 112 can be coupled to the flycap 122. Switch 112 can used to connect the flycap 122 to ground, while switch 110 can be used to connect the flycap 122 to the inductor 128. Top phase-B can further include switches 114 and 116. Switches 114 and 116 can be coupled to the flycap 124. Switch 116 can be used to connect the flycap 124 to ground, while switch 114 can be used to connect the flycap 124 to the inductor 128. Switches 102 can be controlled by the third clock 146, while switches 104, 112 and 114 can be controlled by a clock 149 that is inverse of the third clock 146. Switch 106 can be controlled by the second clock 140, while switch 108 can be controlled by a clock 151 that is its inverse of the second clock 140. Switches 118 can be controlled by fourth clock 148, while switches 110, 120 and 116 can be controlled by a clock 153 that is inverse of fourth clock 148. In circuit 100, top phase-A 101 and top phase-B 103 can operate alternatively as to charging of the flycaps 122 and 124. The flycaps 122 and 124 can provide a continuous power supply for the bottom phase 105. In this way, connection node 107 can operate without using a charging capacitor since either of the flycaps 122 or 124 is continuously connected at connection node 107, thereby providing a supply voltage for the operation of bottom phase 105. Thus, a positive feedback loop can be avoided and an interruption of functioning of a series stacked phase DC-DC power converter circumvented. Furthermore, circuit 100 can operate without a positive feedback and without a use of relatively high voltage rated devices, thereby reducing systems costs.

Now referring simultaneously to FIGS. 1 and 2A, an embodiment of a switching sequence and timing diagram 200A for circuit 100 is illustrated. Timing diagram 200A illustrates a case for 50% duty cycle operation for circuit 100. In a first time period, referring to top phase-A 101, when third clock 146 is high, switch 102 can be controlled to be on and charge the flycap 122. Switches 104 and 112 can be controlled to be off because they are controlled by an inverse of third clock 146. Switch 110 can be controlled to be on during this time because switch 110 is controlled by inverse of fourth clock 148 which is high during this time. Thus, a path for current flow can form from yin to flycap 122 to inductor 128 to $V_{out}$. During this period, flycap 122 gets charged. In a similar way, referring to top phase-B 103, when fourth clock 148 is high, switch 118 can be controlled to be on and charge the flycap 124. Switches 120 and 116 can be turned off because they are controlled by clock 153 (inverse of fourth clock 148). Switch 114 can be controlled to be on during this time because switch 114 is controlled by inverse of third clock 146 which is high during this time.

Thus, a path for current flow can form from yin to flycap 124 to inductor 128 to $V_{out}$. During this period flycap 124 gets charged.

In a second time period, when third clock 146 is low and its inverse is high, switches 104, 110, 112, 114, 116 and 120 can be controlled to be on. Thus, flycaps 122 and 124 get connected in parallel between node $V_M$ and ground. This maximizes the capacitance connected to node $V_M$. Further, the impedance to ground for inductor 128 gets minimized because switches 110 and 112 get connected in parallel to switches 114 and 116. Moreover, an effective resistance connected between flycaps 122 and 124 to node $V_M$ is minimized because switches 104 and 120 appear in a parallel configuration between the flycaps and node $V_M$, and an effective resistance connected between flycaps 122 and 124 to ground 115 can be minimized because switches 112 and 116 appear in a parallel configuration to ground. In this way, these switches can be optimized to be relatively small for operation of the converter at peak efficiency.

Now referring simultaneously to FIGS. 1 and 2B, an embodiment of a switching sequence and timing diagram 200B for circuit 100 is illustrated. Timing diagram 200B illustrates a case for maximum duty cycle operation for circuit 100. In the maximum duty cycle mode of operation, a first clock 138 runs at its maximum duty cycle, while a second clock 140 runs at its maximum duty cycle as well. Circuit 100 can function normally under these conditions and there is no interruption of functioning of the circuit 100. In some embodiments, during charging period of inductor 128, there can be two switches in series (either 102 and 110, or 118 and 114) with the inductor 128. The slight increase in the effective resistance in series with inductor 128 may cause a slight reduction in maximum efficiency of the converter, however this can be compensated by the smaller losses in the low side operation of the top phases.

It will be understood by those skilled in the art that there can be alternative methods of controlling the switches in circuit 100 in order to phase the switches in such a way as to achieve simpler overall loop control. In an alternative switching scheme, instead of turning on all switches 104, 112, 110, 114, 116, and 120 together as previously described, an active phase and an inactive phase can be devised where switch 110 is turned on when top phase-A is active, and switch 114 can be turned on when top phase-B is active. In this switching scheme, inductor 128 can discharge its current through switches 110 and 112, or through switches 114 and 116. In this way, it can be relatively easy to monitor and to detect, for example, a zero inductor current condition. In this scheme, flycap 122 and flycap 124 can operate alternatively as flying capacitors and the capacitor for node $V_M$, and may or may not have a short overlap period. In another switching scheme example, during light load conditions, flycap 122 and flycap 124 can be operated in parallel in order to minimize power losses. In yet another switching scheme example, the terminals of either of the flycaps 122 or 124 can be tri-stated which can be useful in reducing noise and/or reducing capacitor to capacitor charge sharing losses. It will be further understood by those skilled in the art that alternate methods of controlling the switches in circuit 100 can be utilized to optimize light load efficiency, or to minimize area, and/or to minimize electromagnetic interference (EMI).

Although systems and methods for removing flying capacitor charge transfer in series stacked phase DC-DC converters are described and illustrated herein with respect to one particular configuration of series stacked DC-DC power converter circuits, embodiments of the disclosure are suitable for use with other configurations of power converters. For example, DC-DC power converter circuits can employ embodiments of the disclosure to remove positive feedback loops and operate more efficiently.

In some embodiments, the described switched can be formed in silicon, or any other semiconductor material. In various embodiments, the described switches can be transistors. In some embodiments, the described switches can be metal oxide semiconductor field effect transistors (MOSFETs). In various embodiments, the disclosed MOSFETS can all be formed on one single die well. In some embodiments, the disclosed series stacked phase DC-DC converter can be monolithically integrated onto a single die. In various embodiments, top phase-A, top phase-B and bottom phase can be formed on separate individual die. In some embodiments, top phase-A, top-phase-B and bottom phase and any combination of them can be formed in groups on separate die, for example, top phase-A and top phase-B can be formed on a single die and bottom phase can be formed on another die, or top-phase A and bottom phase can be formed on a single die and top phase-B can be formed on another die. In various embodiments, top phase-A, top phase-B and bottom phase can all be integrated into one electronic package, for example, but not limited to, into a quad-flat no-lead (QFN) package, or into a dual-flat no-leads (DFN) package, into a ball grid array (BGA) package. In some embodiments, top phase-A, top phase-B and bottom phase can be individually packaged into an electronic package. In various embodiments, controller circuits and/or control logic circuits can be integrated into a single die along with the disclosed series stacked phase DC-DC converter.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics.

However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
    a first top buck converter circuit coupled to a second top buck converter circuit at a first connection node and a second connection node; and
    a bottom buck converter circuit coupled to the first top buck converter circuit and to the second top buck converter circuit at the second connection node;
    a power input terminal coupled to the first and second top buck converter circuits, wherein the power input terminal is not directly connected to the first connection node; and
    a power output terminal coupled to the bottom buck converter circuit and to the first connection node, wherein the power output terminal is coupled to the first connection node through only a first inductor.

2. The circuit of claim 1, wherein the first top buck converter circuit comprises a first high-side switch coupled to a first low-side switch at a first switch node.

3. The circuit of claim 2, wherein the first top buck converter circuit comprises a first flying capacitor coupled to the first switch node.

4. The circuit of claim 3, wherein the second top buck converter circuit comprises a second high-side switch coupled to a second low-side switch at a second switch node.

5. The circuit of claim 4, wherein the second top buck converter circuit comprises a second flying capacitor coupled to the second switch node.

6. The circuit of claim 4, wherein the power input terminal is coupled to the first and second high-side switches.

7. The circuit of claim 6, wherein the first flying capacitor is coupled to the first inductor through a first switch, and the second flying capacitor is coupled to the first inductor through a second switch.

8. The circuit of claim 7, wherein the bottom buck converter circuit comprises a third high-side switch coupled to a third low-side switch at a third switch node.

9. The circuit of claim 8, wherein the third switch node is coupled to a second inductor.

10. The circuit of claim 9, wherein the power output terminal is coupled to the third switch node through the second inductor and to the first connection node through the first inductor.

11. A circuit comprising:
    a first top buck converter circuit coupled to an input terminal;
    a second top buck converter circuit coupled to the input terminal, the first top buck converter circuit coupled to the second top buck converter circuit at first and second connection nodes, wherein the input terminal is not directly connected to the first connection node;
    a bottom buck converter circuit coupled to the first top buck converter circuit and to the second top buck converter circuit at the second connection node; and
    an output terminal coupled to the bottom buck converter circuit and to the first connection node, wherein the output terminal is coupled to the first connection node through only a first inductor.

12. The circuit of claim 11, wherein the first top buck converter circuit comprises a first high-side switch coupled to a first low-side switch at a first switch node.

13. The circuit of claim 12, wherein the first top buck converter circuit comprises a first flying capacitor coupled to the first switch node.

14. The circuit of claim 13, wherein the second top buck converter circuit comprises a second high-side switch coupled to a second low-side switch at a second switch node.

15. The circuit of claim 14, wherein the input terminal is coupled to the first and second high-side switches.

16. The circuit of claim 14, wherein the second top buck converter circuit comprises a second flying capacitor coupled to the second switch node.

17. The circuit of claim 16, wherein the first flying capacitor is coupled to the first inductor through a first switch, and the second flying capacitor is coupled to the first inductor through a second switch.

18. The circuit of claim 17, wherein the bottom buck converter circuit comprises a third high-side switch coupled to a third low-side switch at a third switch node.

19. The circuit of claim 18, wherein the third switch node is coupled to a second inductor.

20. The circuit of claim 11, wherein the first and second top buck converter circuits and the bottom buck converter circuit are arranged to generate an output voltage at the output terminal that is lower than an input voltage at the input terminal.

* * * * *